(12) United States Patent
Christianson et al.

(10) Patent No.: US 9,288,969 B2
(45) Date of Patent: Mar. 22, 2016

(54) PUZZLE PET TOY AND TREAT DISPENSER

(71) Applicants: Tristan M Christianson, San Francisco, CA (US); Gregory Snyder, Novato, CA (US)

(72) Inventors: Tristan M Christianson, San Francisco, CA (US); Gregory Snyder, Novato, CA (US)

(*) Notice: Subject to any disclaimer, the term of this patent is extended or adjusted under 35 U.S.C. 154(b) by 77 days.

(21) Appl. No.: 14/229,895

(22) Filed: Mar. 29, 2014

(65) Prior Publication Data

US 2015/0128875 A1   May 14, 2015

Related U.S. Application Data

(60) Provisional application No. 61/903,273, filed on Nov. 12, 2013.

(51) Int. Cl.
*A01K 15/02* (2006.01)
*A01K 5/01* (2006.01)
*A01K 5/02* (2006.01)

(52) U.S. Cl.
CPC ............. *A01K 15/025* (2013.01); *A01K 5/0114* (2013.01); *A01K 5/0275* (2013.01); *A01K 5/0291* (2013.01)

(58) Field of Classification Search
CPC ........................... A01K 15/025; A01K 15/026
See application file for complete search history.

(56) References Cited

U.S. PATENT DOCUMENTS

| | | |
|---|---|---|
| 4,889,077 A | 12/1989 | Possis |
| 5,078,097 A | 1/1992 | Chisholm |
| 5,213,232 A | 5/1993 | Kraft et al. |
| D339,429 S | 9/1993 | Reid et al. |
| 5,377,620 A | 1/1995 | Phillippi |
| 5,553,570 A | 9/1996 | VanNatter, III et al. |
| 5,819,690 A | 10/1998 | Brown |
| 5,832,877 A | 11/1998 | Markham |
| 5,865,147 A | 2/1999 | Rubin |
| 5,957,082 A | 9/1999 | Budman et al. |
| 6,073,581 A | 6/2000 | Wang |
| 6,098,571 A | 8/2000 | Axelrod et al. |
| 6,158,391 A | 12/2000 | Simonetti |
| 6,237,538 B1 | 5/2001 | Tsengas |
| 6,273,027 B1 | 8/2001 | Watson et al. |
| 6,349,671 B1 | 2/2002 | Lewis et al. |
| 6,367,417 B1 | 4/2002 | Gal et al. |
| 6,484,671 B2 | 11/2002 | Herrenbruck |
| 6,526,912 B1 | 3/2003 | Ottoson |
| 6,557,496 B2 | 5/2003 | Herrenbruck |

(Continued)

*Primary Examiner* — Monica Williams
*Assistant Examiner* — Aaron Rodziwicz

(57) ABSTRACT

A puzzle pet toy and treat dispenser comprising of a housing, a lid, an inner chamber, a drum aperture, a motor assembly, and an external chamber. The inner chamber is divided by a plurality of vertical radial walls, creating a plurality of containers formed by the inner surface of the vertical radial walls, a plurality of tangential walls parallel to the vertical surface of the drum aperture, the inner surface of the drum aperture, and the lid. The plurality of containers hold non-liquid pet treats, and an opening on the drum aperture aligned vertically with the tangential walls allows the pet treat on a given container to be released into the external chamber, where said treats can be dispensed outside of the pet toy and treat dispenser during play. A motor assembly rotates the drum aperture to the next opening, creating a revolver action to dispense the contents of the next chamber. The toy can be programmed to rotate the aperture at given time intervals, so the pet can receive treats on a predetermined schedule while the owner is away. The motor assembly also contains a means of noise generation during the rotating action to attract the pet to come and play with the toy.

7 Claims, 19 Drawing Sheets

(56) References Cited

U.S. PATENT DOCUMENTS

| | | |
|---|---|---|
| 6,609,944 B1 | 8/2003 | Viola |
| 6,623,328 B1 | 9/2003 | Theel |
| 6,688,258 B1 | 2/2004 | Kolesar |
| 6,694,916 B1 | 2/2004 | Rucker et al. |
| 6,904,868 B2 | 6/2005 | Block et al. |
| 6,945,195 B1 | 9/2005 | Morrison |
| 7,104,222 B2 | 9/2006 | Tsengas |
| 7,219,620 B2 | 5/2007 | Rucker et al. |
| 7,367,283 B2 | 5/2008 | Aboujaoude et al. |
| 7,389,748 B2 | 6/2008 | Shatoff et al. |
| RE40,430 E | 7/2008 | Markham |
| 7,506,613 B2 | 3/2009 | Wolfe, Jr. et al. |
| 7,536,978 B2 | 5/2009 | Washington et al. |
| 7,555,997 B2 | 7/2009 | Wolfe, Jr. et al. |
| RE40,872 E | 8/2009 | Markham |
| 7,574,978 B1 | 8/2009 | Peterson |
| 7,600,488 B2 | 10/2009 | Mann |
| 7,650,855 B2 | 1/2010 | Krishnamurthy |
| 8,141,521 B2 | 3/2012 | Shatoff et al. |
| 8,220,413 B2 | 7/2012 | Laro |
| 8,225,747 B2 | 7/2012 | Markham et al. |
| 8,424,489 B2 | 4/2013 | Desrosiers |
| 8,474,404 B2 | 7/2013 | Costello |
| 2005/0224003 A1 | 10/2005 | Yin et al. |
| 2008/0121190 A1 | 5/2008 | Moulton |
| 2011/0139815 A1 | 6/2011 | Benson |
| 2011/0226187 A1* | 9/2011 | Bertsch ............ A01K 5/0114 119/61.55 |
| 2012/0060766 A1 | 3/2012 | Brandon |
| 2013/0055965 A1* | 3/2013 | Valle ................ A01K 15/025 119/710 |
| 2014/0373788 A1* | 12/2014 | Ragonetti ........... A01K 15/025 119/51.01 |
| 2015/0101546 A1* | 4/2015 | Simon ................ A01K 15/025 119/710 |

* cited by examiner

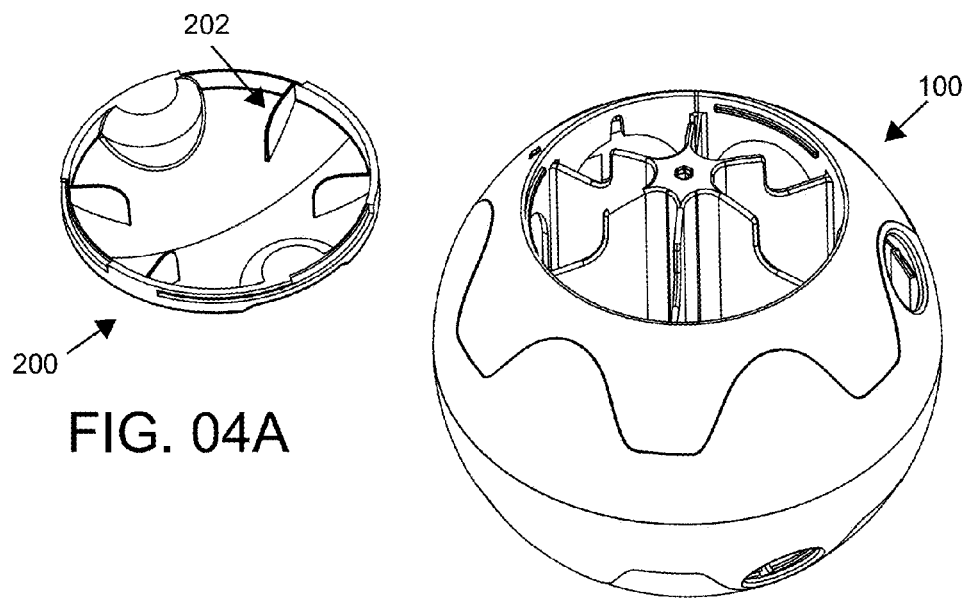
FIG. 04A
FIG. 04B
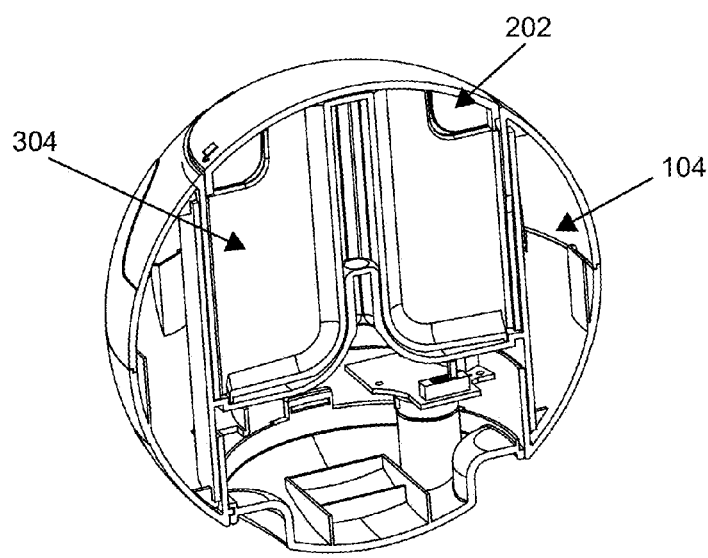
FIG. 05

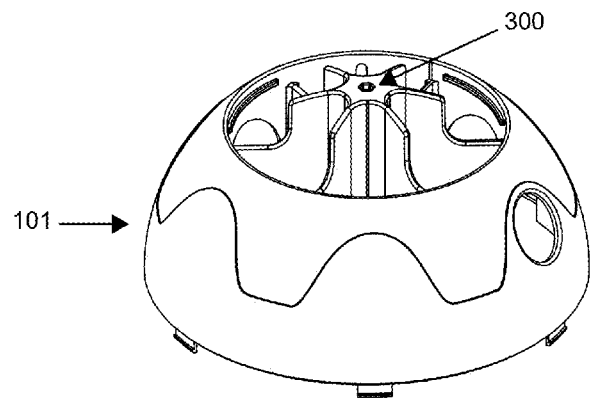
FIG. 07
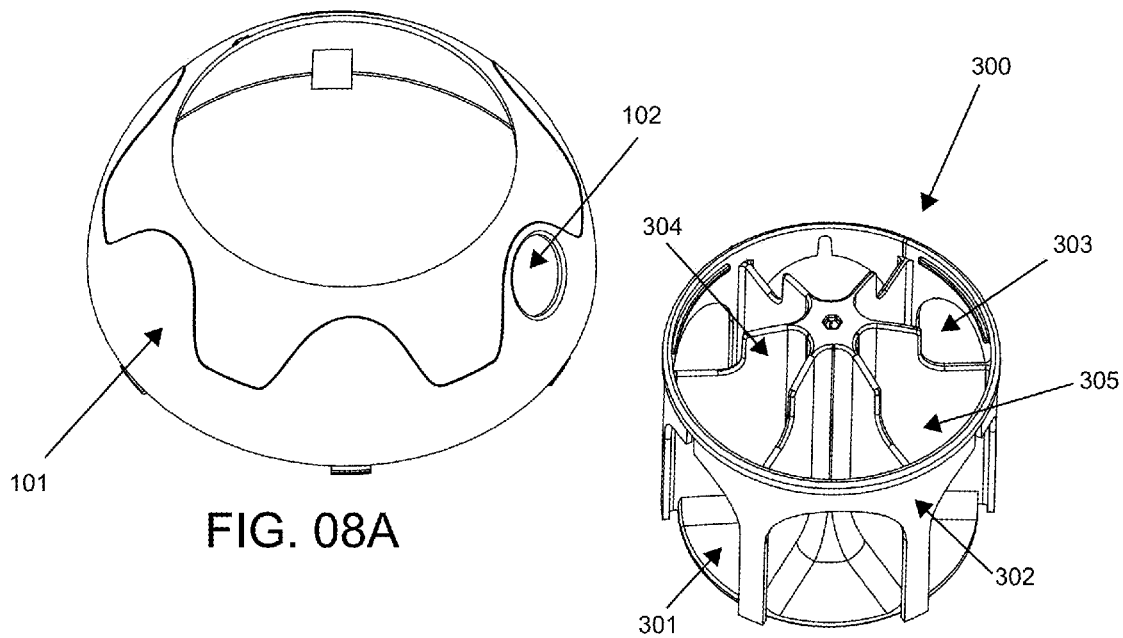
FIG. 08A
FIG. 08B

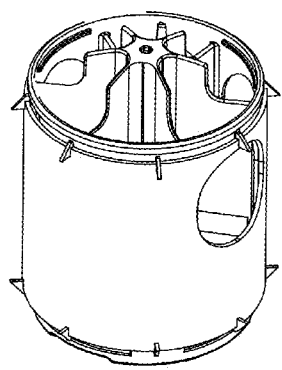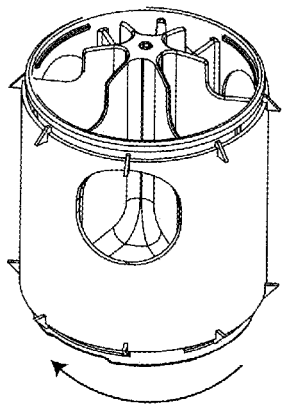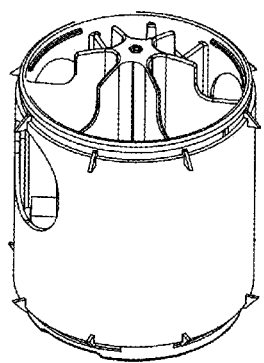
FIG. 14A
FIG. 14B
FIG. 14C

PUZZLE PET TOY AND TREAT DISPENSER

CROSS REFERENCE TO RELATED APPLICATIONS

This application claims priority date to a U.S. Provisional Patent Application 61/903,273 titled "Pet Toy and Treat Dispenser", filed on Nov. 12, 2013.

STATEMENT REGARDING FEDERALLY SPONSORED RESEARCH AND DEVELOPMENT

None.

FIELD OF THE INVENTION

The present invention relates to puzzle pet toys that dispense food or treats, and particularly, to a puzzle pet toy having a plurality of separate chambers that enables the dispensing of treats/food in a controlled way to thereby selectively dispense treats/food at a regular interval.

BACKGROUND

Interactive pet toys are becoming increasingly popular. It is well known in the field that there are many benefits attributed to a pet toy that may stimulate an animal. As an example, the physical and mental health of a pet may be improved with interactive toys that cause a pet to be productively engaged with the toy.

Pet toys that dispense treats are commercially available in myriads of configuration. By regulating the intensity and length of time an animal is occupied, the animal may be less prone to engage in negative behaviors. For example, a pet toy that dispenses treats while the owner is away is likely to pacify the pet from foraging food and engage in a destructive behavior in its living space.

While treat dispensing pet toys are generally known, many shortcomings of the prior art are not yet addressed in the field. One issue is the inability to sanitize the inner parts of the toy because of the construction of the toy. Other disadvantages with the prior art is that the toy cannot regulate the rate of the treat being dispensed relative to the pet's attention. For an example, a hungry pet may be aggressively seeking every piece of the treat contained within the toy, while a disinterested pet may not even touch the toy without other motivations to do so. Because of these issues, pet toys from the prior art require a large degree of human supervision in order to be optimal and safe to use with pets.

Another issue that has not been addressed in the prior art is providing a motorized toy and treat dispenser present in the same device. In addition, pet toys involving motorized parts are notoriously difficult to clean unless the motor can be removed from the toy for cleaning. Therefore most automatic feeders are stationary designs where the feeder dispenses food from a chamber to a pet bowl, and are not designed for the pets to interact with the feeder.

For the foregoing reasons, there is a need for a pet toy and treat dispenser that can entertain a pet for a few hours with minimal human supervision, and is relatively easy to clean and maintain.

SUMMARY OF THE INVENTION

The present invention is directed to a motorized puzzle pet toy and treat dispenser that enable a pet owner to automatically regulate the rate of dispensing of various types of treat/food from the device. The word "treat" used hereinafter is intended to include all animal foodstuffs that can be consumed by an animal to include traditional treats and food of widely varying types. Treats may take a number of different forms such as uniformly sized nuggets, or the treats can be irregularly sized and shaped.

The puzzle element of the preferred embodiment requires the pet to interact with the puzzle toy and treat dispenser in order for the toy to dispense the treat to the pet, unlike other pet food dispensers that dispense the treat without the need of the pet's interaction with the dispenser.

According to a preferred embodiment of a device of the present invention, the puzzle pet toy and treat dispenser has a housing, a lid, an internal chamber, an external chamber, removable drum aperture, and a removable motor assembly located at the base of the toy.

The internal chamber has a base, a perimeter wall perpendicular to the base having a cylindrical shape, and a plurality of divider walls that create a plurality of container spaces within the inner chamber. Each container's section of the perimeter wall has an opening that allows treat to be dispensed from said chamber. These containers can be loaded with treats by opening the lid and pouring treats into the separate chambers.

The drum aperture is shaped substantially like a cylinder, and envelops the perimeter walls and the base of the inner chamber. A receiver for a driveshaft is provided at the base of the drum aperture, removable connected to a motor assembly.

The external surface of the drum aperture and the internal surface of the housing form a cavity within the toy, here defined as the external chamber. The drum aperture has an opening in the size and shape of the opening of a perimeter wall of the container section of the internal chamber, such that it allows the treat to dispense from the container to the external chamber when the opening on the drum aperture and the opening of a container are aligned together. In this manner, only a portion of the treat in the inner chamber is dispensed to the external chamber at any given moment. As the drum aperture rotates to the next container, it opens the next container while enclosing the remainder of the containers.

In the preferred embodiment, the housing comprises of two separable pieces forming a substantially spherical toy, with each hemisphere having at least one opening to allow dispensing treats from the external chamber. The lower housing also has a receptacle that conforms to the shape of the removable motor assembly. The separable pieces of the housings allow the toy to be easily serviced by the pet owner, and in the preferred embodiment, all the parts of the toy are to be made of materials that are dishwasher safe.

The motor assembly has at least a motor connected to a drivetrain, which in turn connected to a clutch that leads to a drive shaft. The drive shaft is then inserted into the receiver on the bottom of the drum aperture, which allows the motor to freely rotate the drum aperture. The motor assembly also contains a removable battery to power the motor, a switch to operate the motor, and a noisemaker that generates sound when the drum aperture moves to attract the animal to play with the toy.

During use, the pet must interact with the puzzle toy and treat dispenser in order for the toy to dispense the treats present in the external chamber. The low center of gravity due to having the motor assembly located at the bottom of the puzzle toy allows it to have a roly-poly toy effect, such that if a pet pushes over the toy with its paw or its face, it wobbles for a few moments while seeking the upright orientation of its natural equilibrium state. The puzzle toy will then dispense the treats through the openings on the external surface of the toy until it depletes all the in the external chamber.

In the preferred embodiment, the motor is located at the base of the toy, to act as a lower center of gravity for the toy. This results in a wobbling factor that allows the toy to move around and dispense treats during play, but also ensuring that the positions of the openings are perpendicular to the ground when the toy is standing still. Without this feature, it is very likely that the toy might be inverted or in a position where the chamber opening is not oriented in a way that allows treats to dispense from the inner chamber to the outer chamber.

BRIEF DESCRIPTION OF DRAWINGS

These and other features, aspects, and advantages of the present invention will become better understood with regard to the following descriptions, appended claims and accompanying drawings where:

FIGS. 04A and 04B show the toy assembled and the inner surface of the lid;

FIG. 05 shows a cross section view of the toy, showing the lid aligned with the dividing walls forming a container within the inner chamber, as well as the external chamber formed by the external surface of the drum aperture and the internal surface of the housing;

FIG. 07 shows an alternate view of the upper housing attached to the internal chamber;

FIGS. 08A and 08B show the inner chamber as a separate piece from the upper housing;

FIGS. 14A, 14B, and 14C show an alternate stop animation view of the drum aperture rotating its opening from one container to the next;

REFERENCE NUMBER INDEX

100 Puzzle Pet Toy and Treat Dispenser
101 Upper Housing
102 Lower Housing
103 Housing Opening
104 External Chamber
105 Motor Assembly Receiver
200 Lid
201 Recessed Finger Grips
202 Lid dividers
300 Inner Chamber
301 Inner Chamber Base
302 Inner Chamber Perimeter Wall
303 Inner Chamber Perimeter Wall Opening
304 Inner Chamber Divider Walls
305 Inner Chamber Containers
306 Inner Chamber Base Opening
400 Drum Aperture
401 Drum Aperture Base
402 Drum Aperture Perimeter Wall
403 Drum Aperture Opening
404 Driveshaft Socket
405 Scooping Fins
406 Trigger Actuators
500 Motor Assembly
501 Battery
502 Battery Cover
503 Motor
504 Gears
505 Clutch
506 Striker
507 Noisemaker
508 Driveshaft
509 Stop Switch
510 Interval Selector
511 Power Button
512 LED
513 Recessed Finger Grips
514 Speaker Grill
515 PCB Circuit
600 Pet
700 PCB Logic Flowchart
701 Set time interval step
702 Power up step
703 Chamber Rotation step
704 Conditional check step
705 Reset time interval step
706 Shut down motor and power step
800 User Process Flowchart
801 Open lid step
802 Load container with treats step
803 Close lid step
804 Remove motor assembly step
805 Set timer step
806 Replace motor assembly step
807 Power on step
808 Rotate drum aperture step
809 Repeat process step
810 Wait for interval step
811 Shut down power step

DETAILED DESCRIPTION OF THE PREFERRED EMBODIMENT

Figure 1:
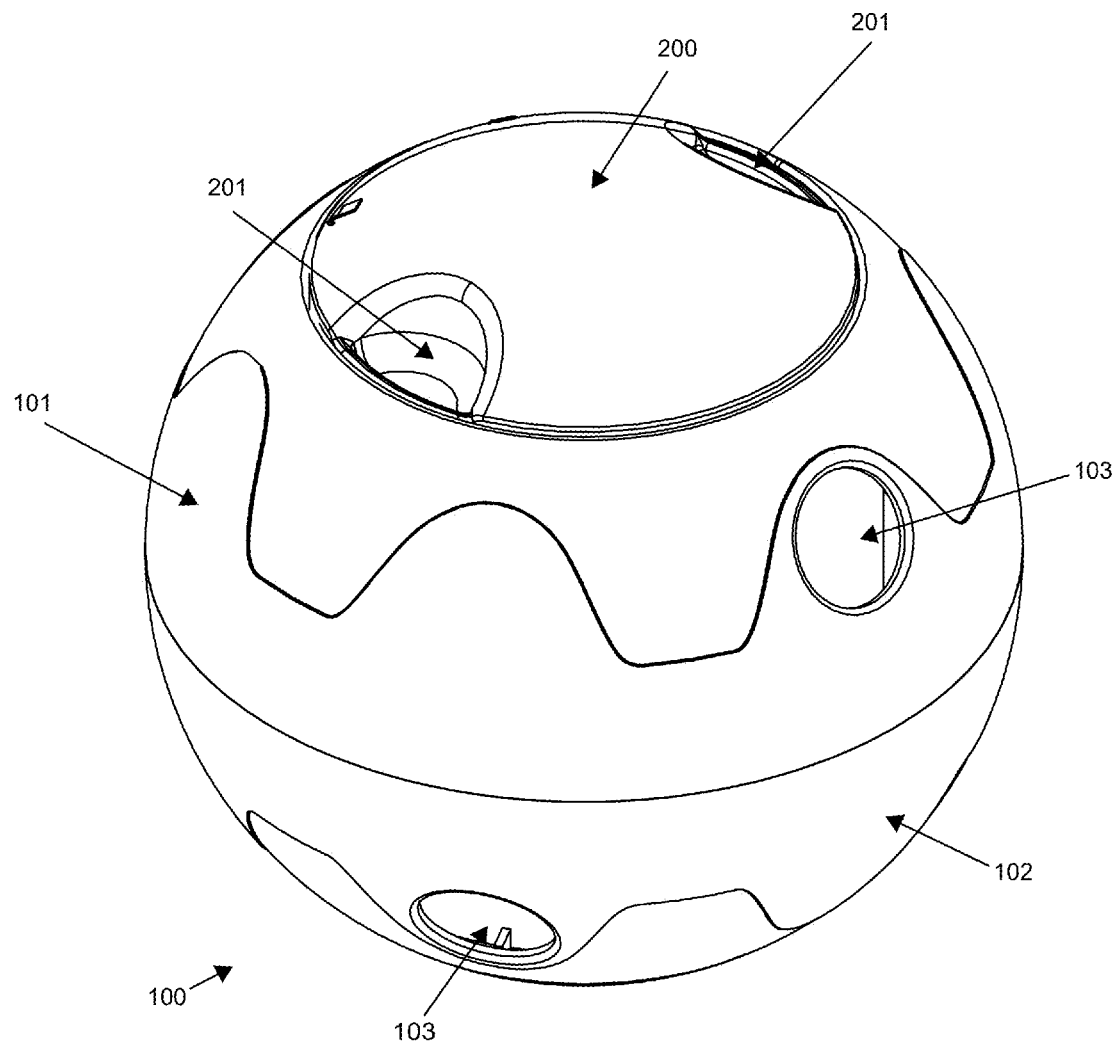
FIG. 01 shows a perspective view of the toy.
Figure 2:
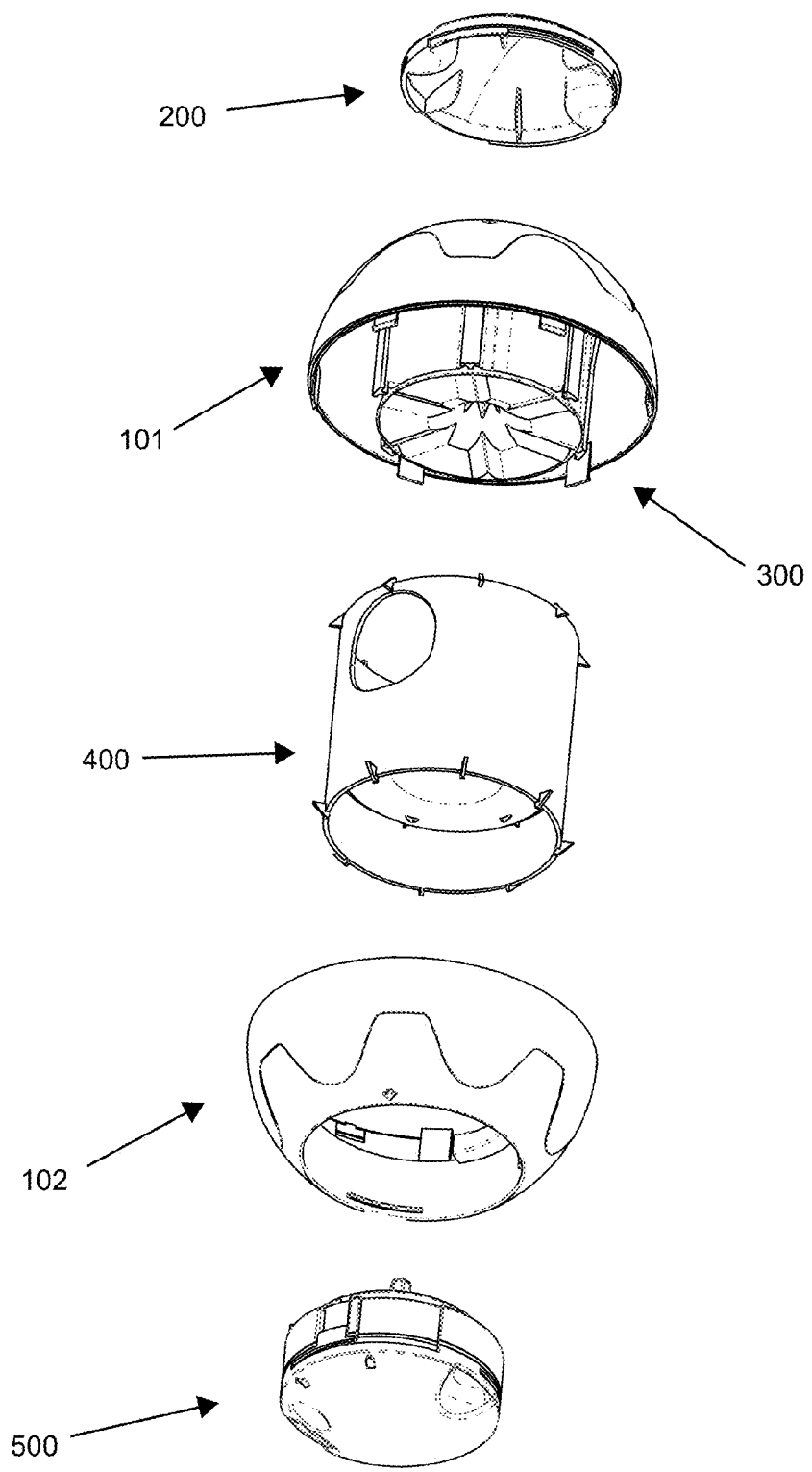
FIG. 02 shows an exploded view of the toy with all the removable parts.
Figure 3A:
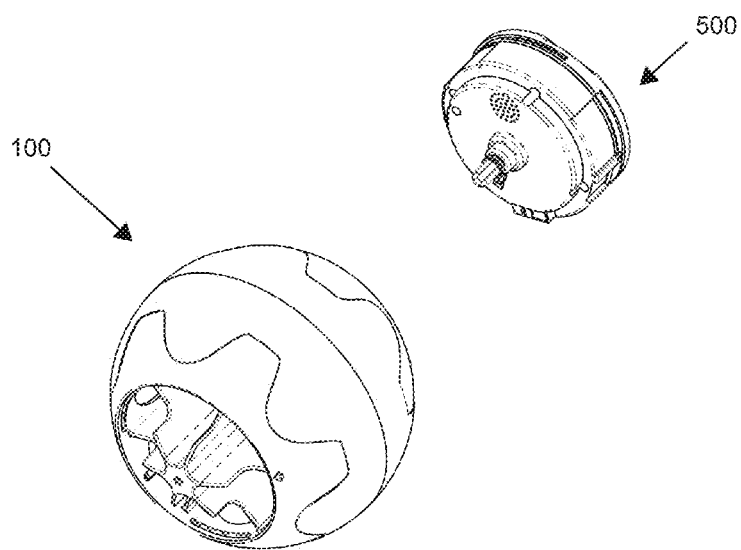
FIGS. 03A and 03B show a semi-exploded view of the toy assembled with the lid and motor assembly removed.
Figure 3B:
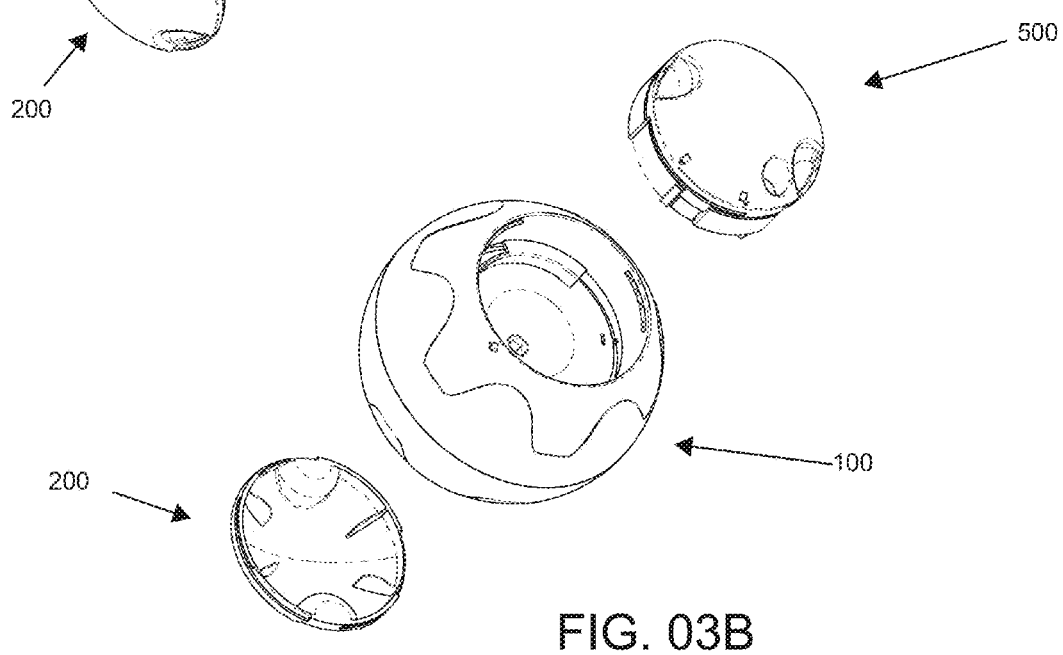
Figure 6:
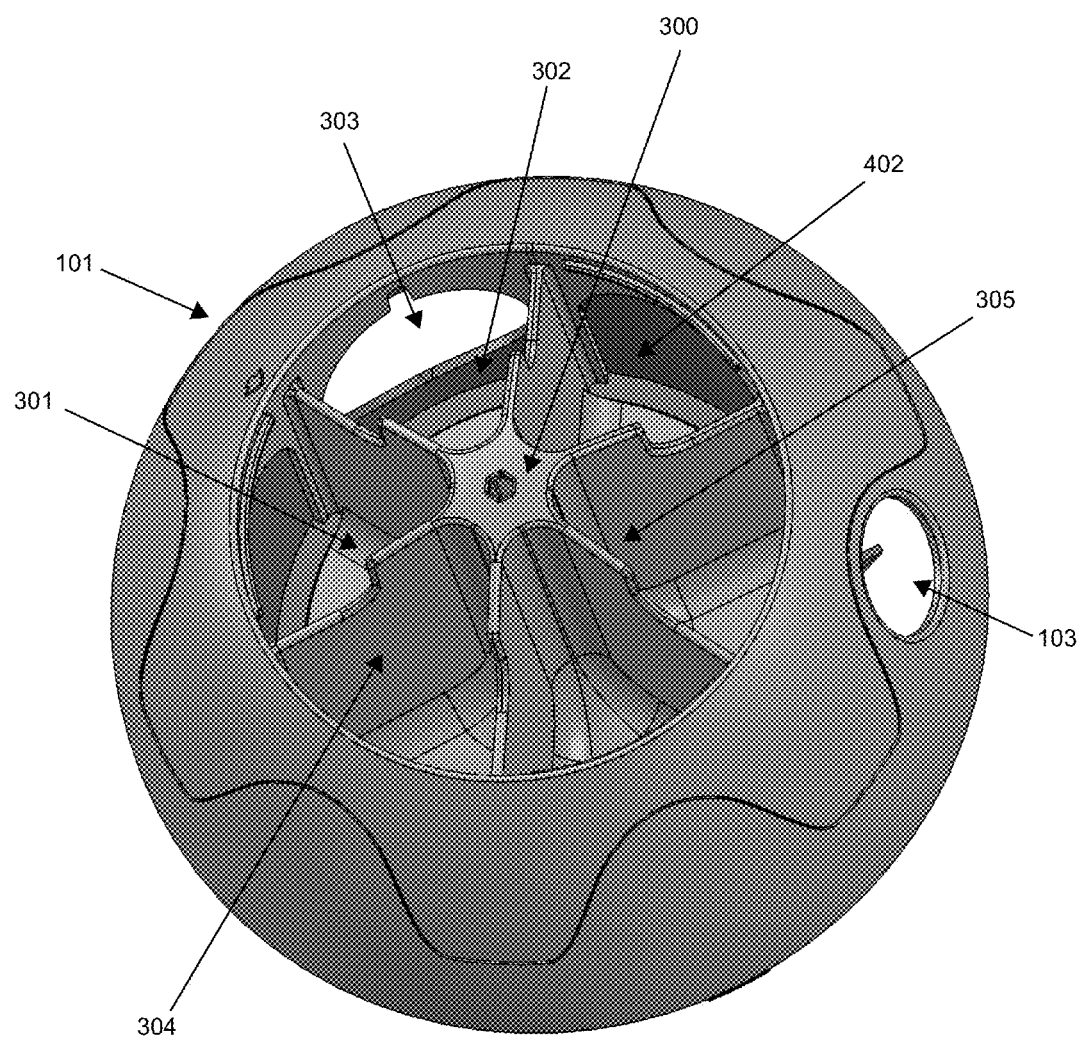
FIG. 06 shows a top perspective view of the toy with a section of the drum aperture enveloping the inner chamber, with the opening of the drum aperture aligned with one of the openings of the container in the inner chamber.
Figure 9:
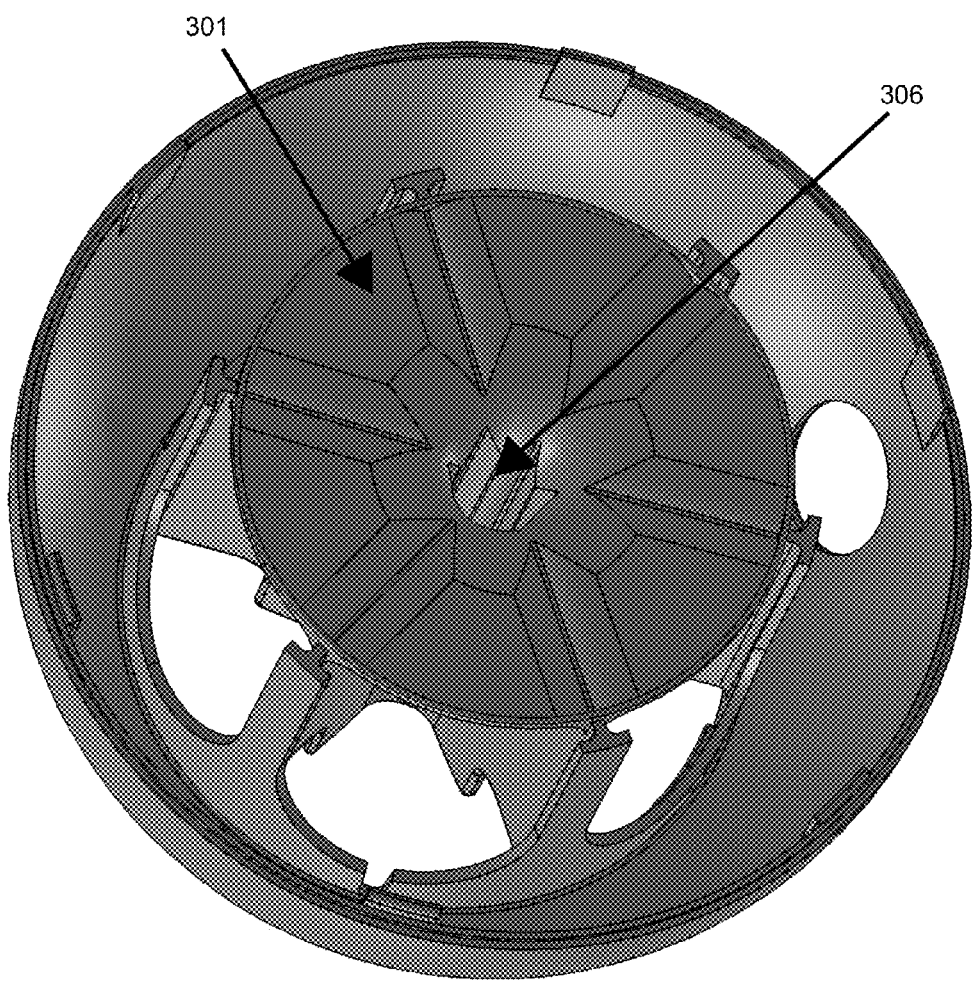
FIG. 09 shows the bottom view of the inner chamber showing the inner chamber base opening to receive the driveshaft socket from the drum aperture.
Figure 10:
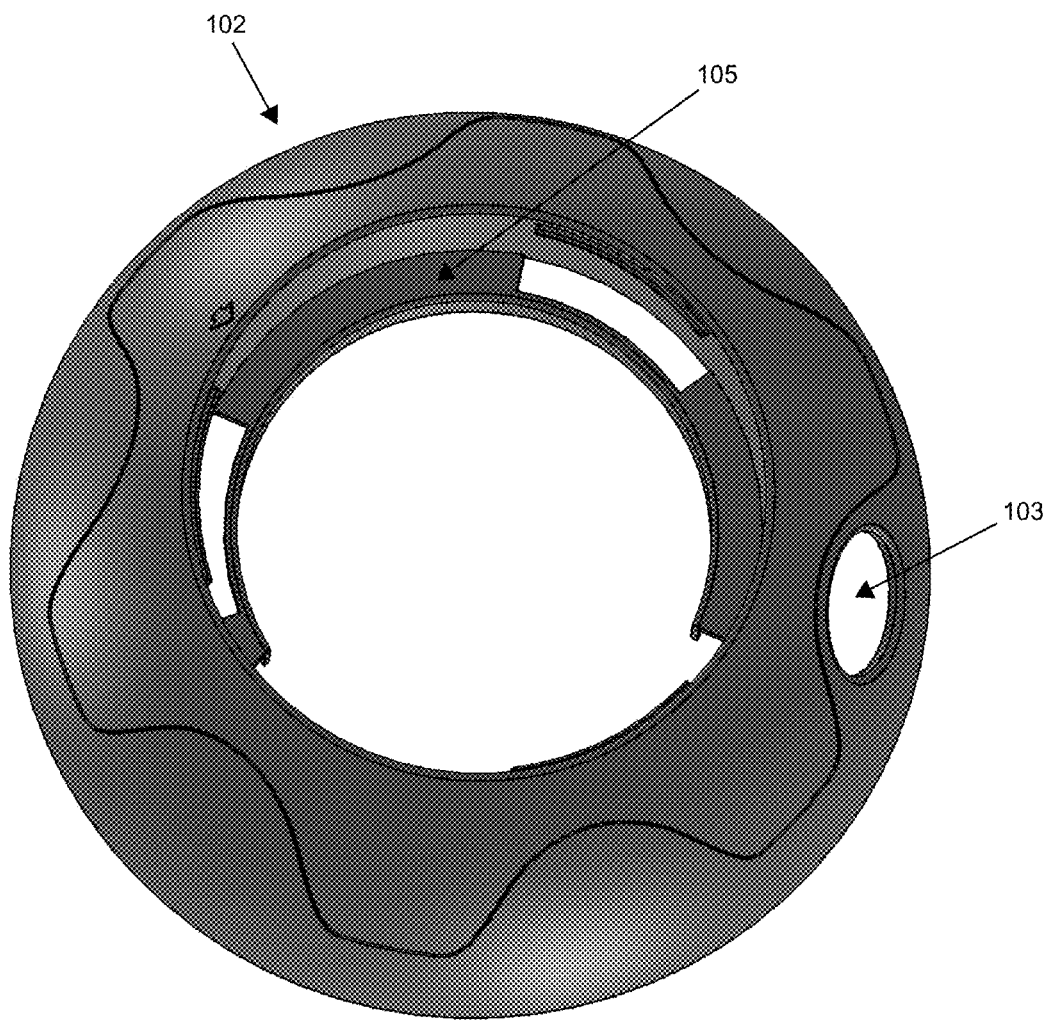
FIG. 10 shows the lower housing assembly with a receptacle to hold the motor assembly within the housing assembly.
Figure 11A:
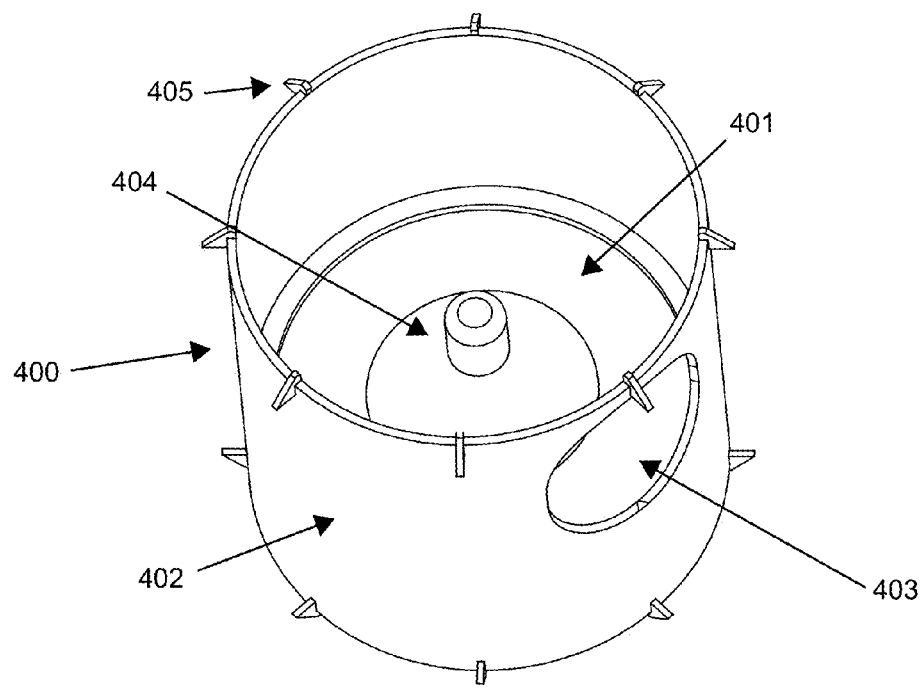
FIG. 11A shows a top perspective view of the drum aperture.
Figure 11B:
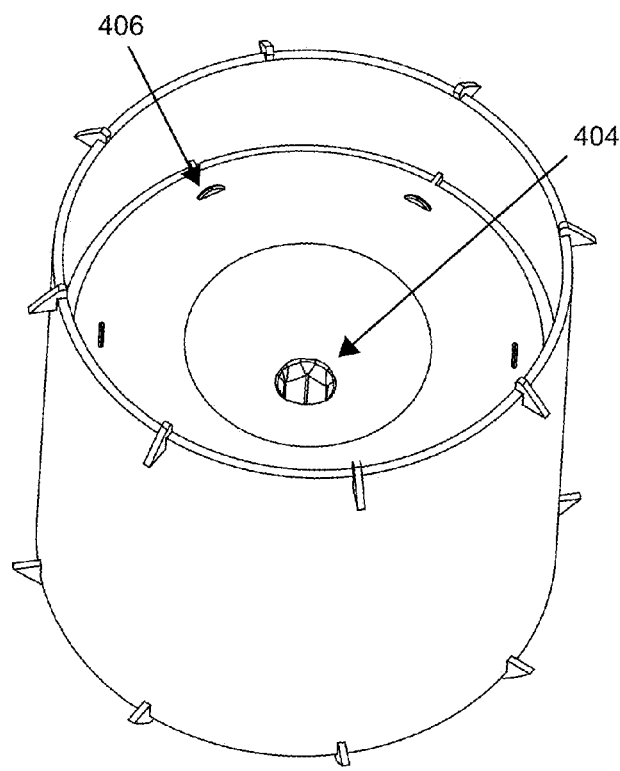
FIG. 11B shows a bottom perspective view of the drum aperture.
Figure 12A:
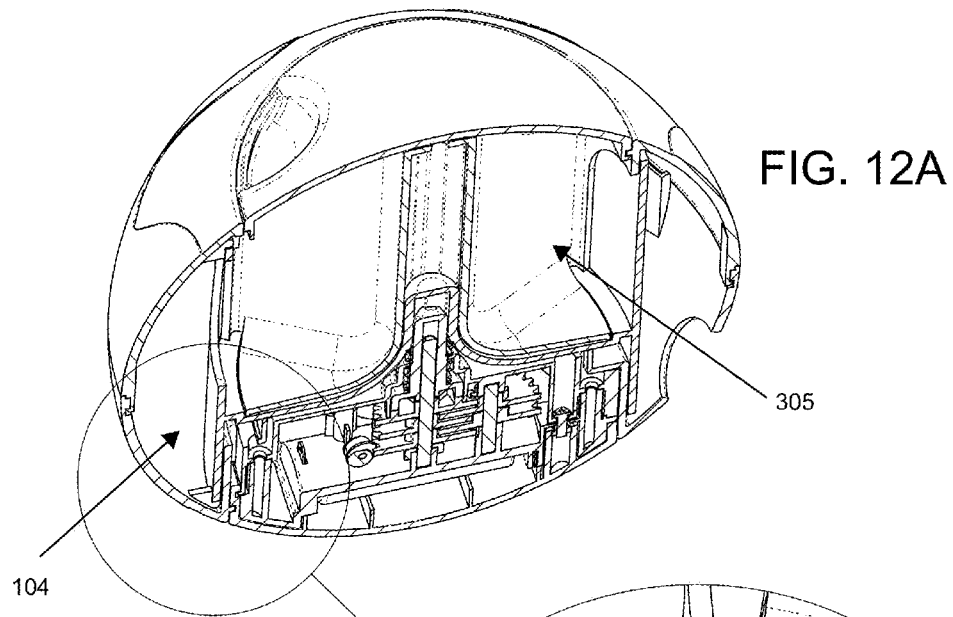
FIGS. 12A and 12B show a close up view of the drum aperture showing the scooping fins.
Figure 12B:
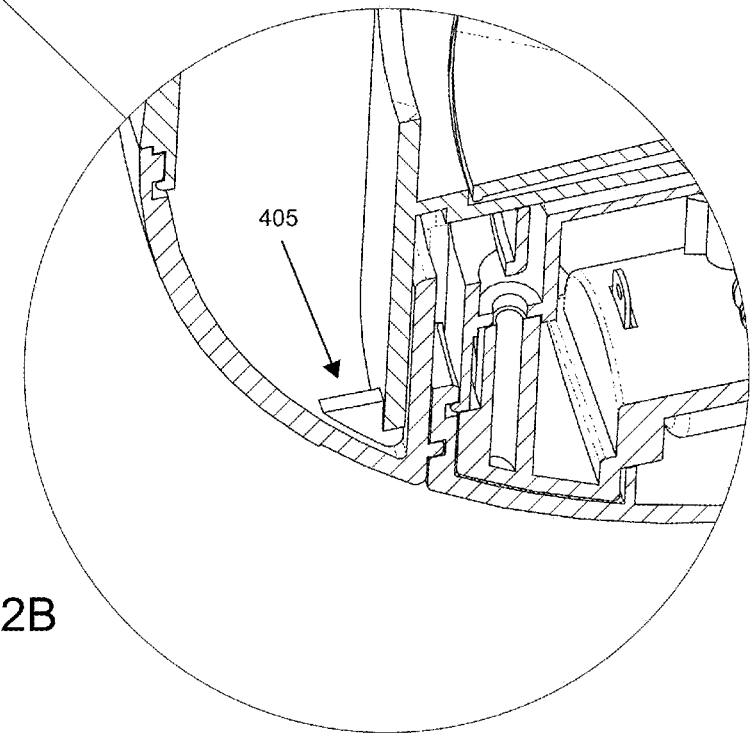
Figure 13A:
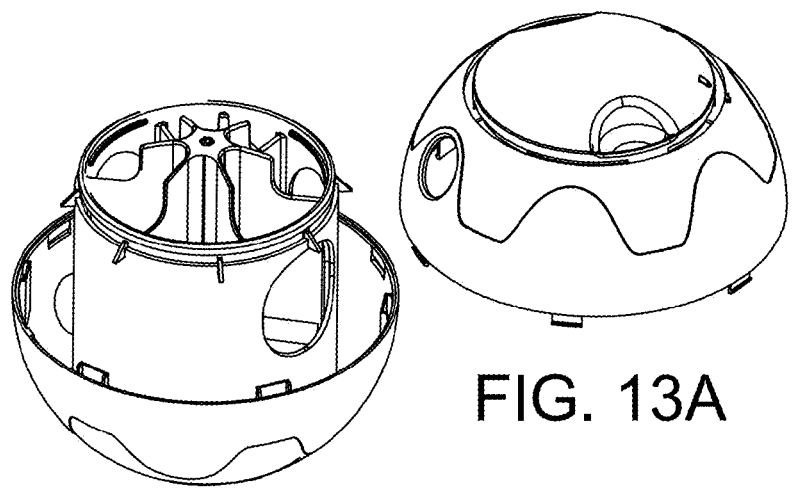
FIGS. 13A, 13B, and 13C show a stop animation view of the drum aperture rotating its opening from one container to the next.
Figure 13B:
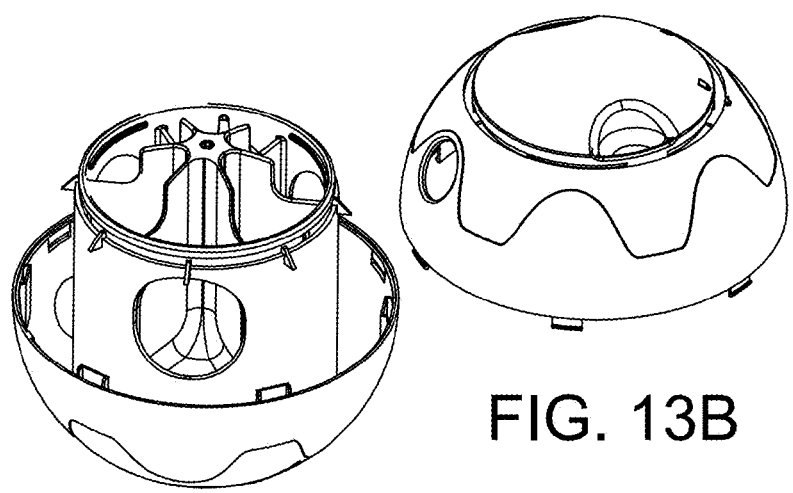
Figure 13C:
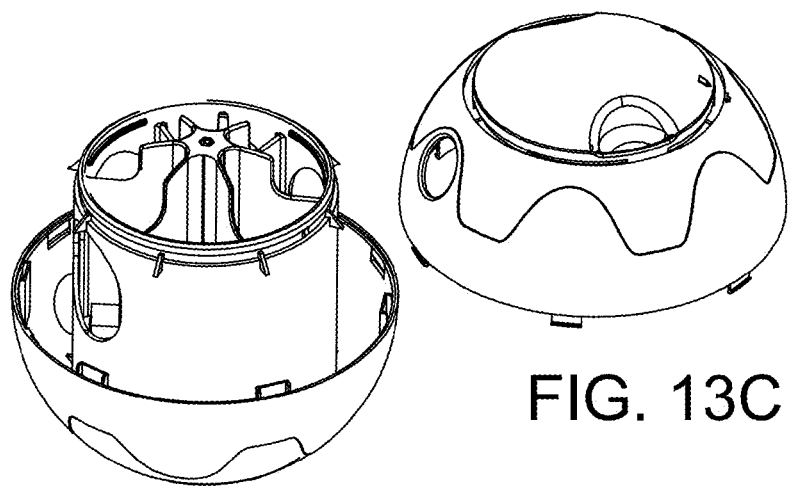

FIG. 1 shows the look and feel of the preferred embodiment of the invention. The preferred embodiment comprises a housing 100, a lid 200, an inner chamber 300, a drum aperture 400, and a motor assembly 500.

The housing 100 has a substantially spherical shape to allow the toy to roll around freely during play. Also in the preferred embodiment, the housing 100 can be formed from two pieces combined into one housing, with the pieces here described as an upper housing 101 and a lower housing 102. The housing should have a plurality of openings 103 to allow treats to dispense from the external chamber 104 within the housing, the external chamber formed by the internal surface of the housing 100 and the external surface of the drum aperture 400. The lower housing 102 has a receptacle that can retain and hold the motor assembly 500 by using a twist-lock method of securing the motor assembly within the lower housing body.

The inner chamber 300 comprises of a base 301, a perimeter wall 302 perpendicular to the base, and a plurality of divider walls 304 that divide the inner chamber into a plurality of containers 305. The divider walls 304 divide the perimeter wall 302 into equal sections, with each section creating an individual treat container 305. On each of the perimeter wall section 302 of a given container is an opening 303 that allows treats to travel from an open container 305 to the external chamber 104. Located on the external surface of the base of the inner chamber 301 is an opening 306 to receive the driveshaft socket 404 of the drum aperture 400. It should be noted that the internal surface of the opening on inner chamber base 306 does not come to contact with the external surface of the driveshaft socket 404 at any point, only to provide space for the socket during assembly.

Figure 15A:
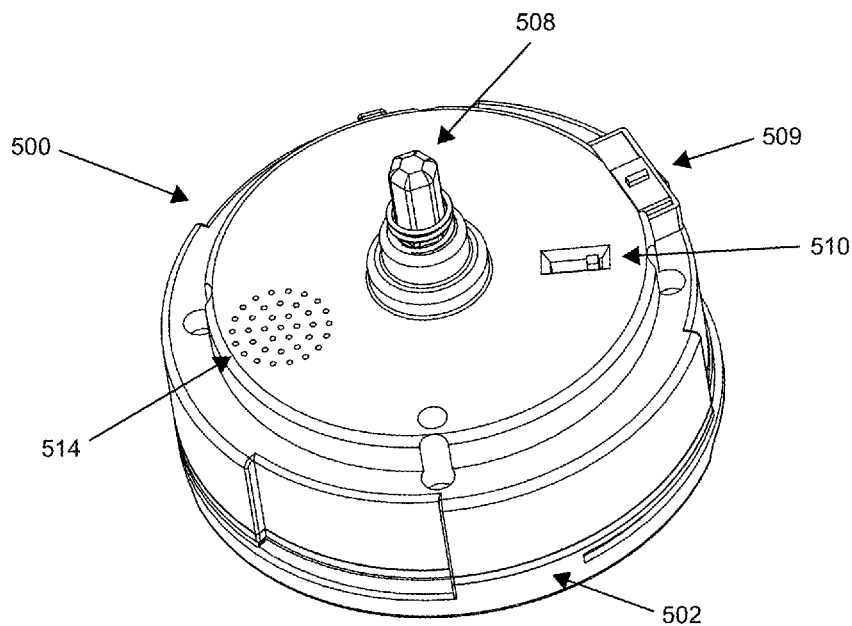
FIG. 15A shows a perspective view of the inner side of the motor assembly.
Figure 15B:
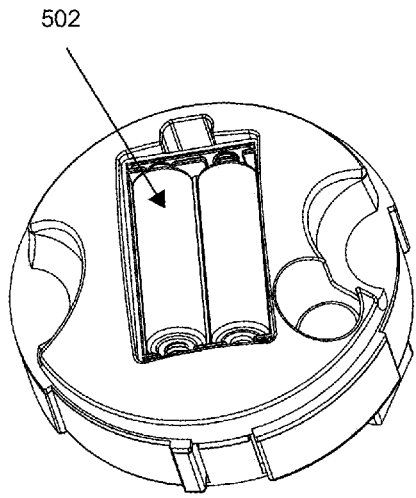
FIG. 15B shows a perspective view of the outer side of the motor assembly without the battery cover.
Figure 15C:
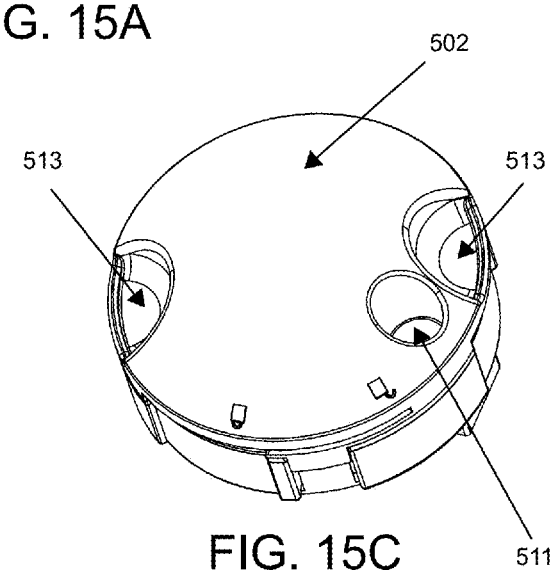
FIG. 15C shows a perspective view of the outer side of the motor assembly with the battery cover.
Figure 16:
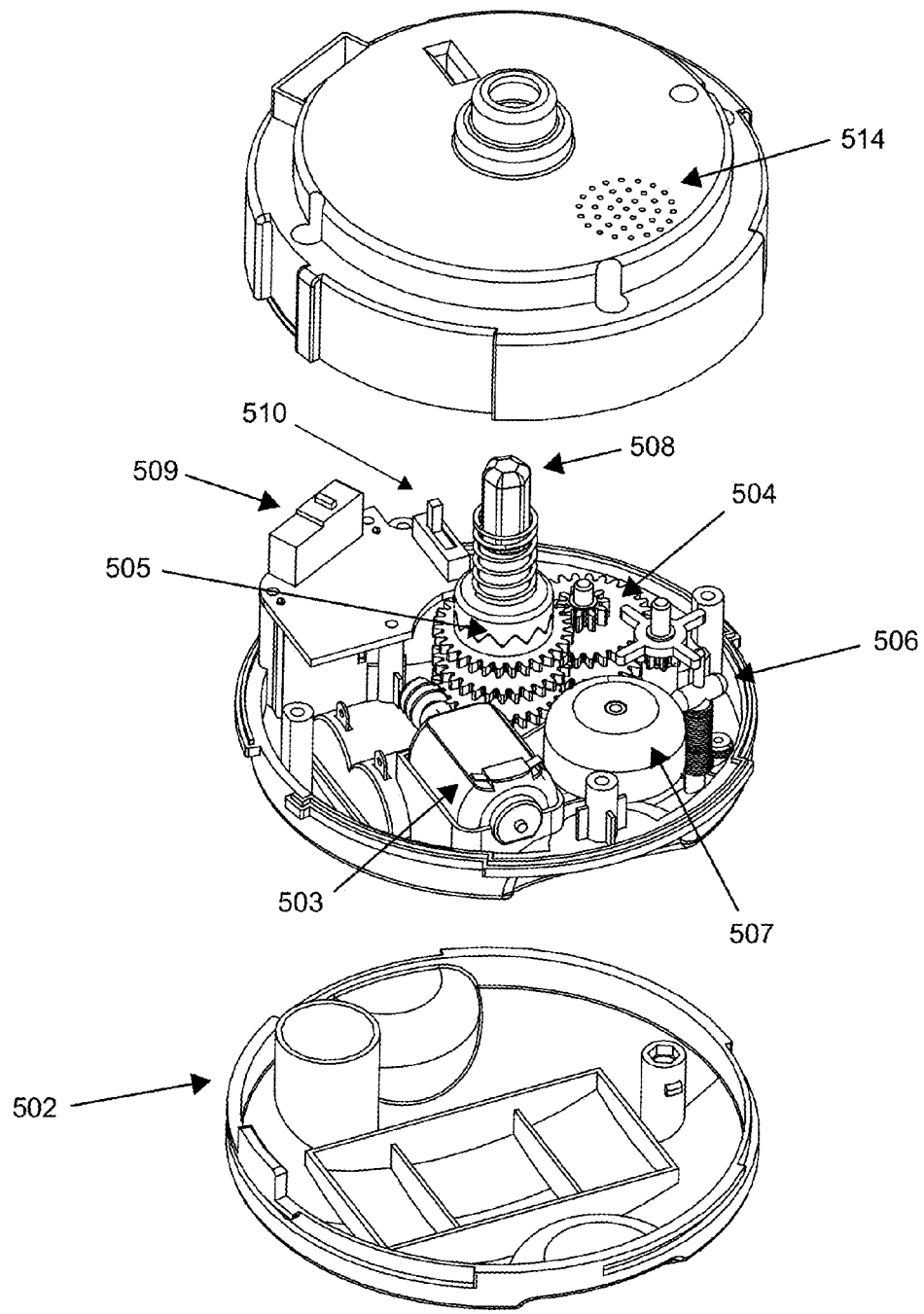
FIG. 16 shows an exploded view of the motor assembly.
Figure 17A:
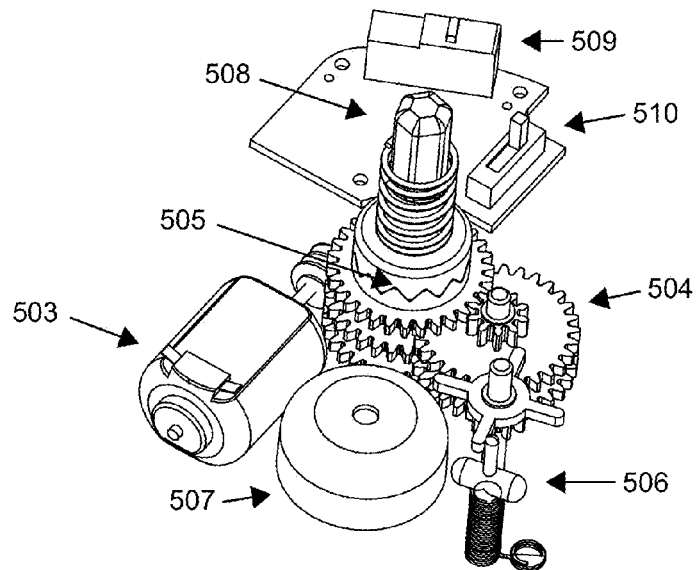
FIGS. 17A, 17B, and 17C show the internal views of the motor assembly.
Figure 17B:
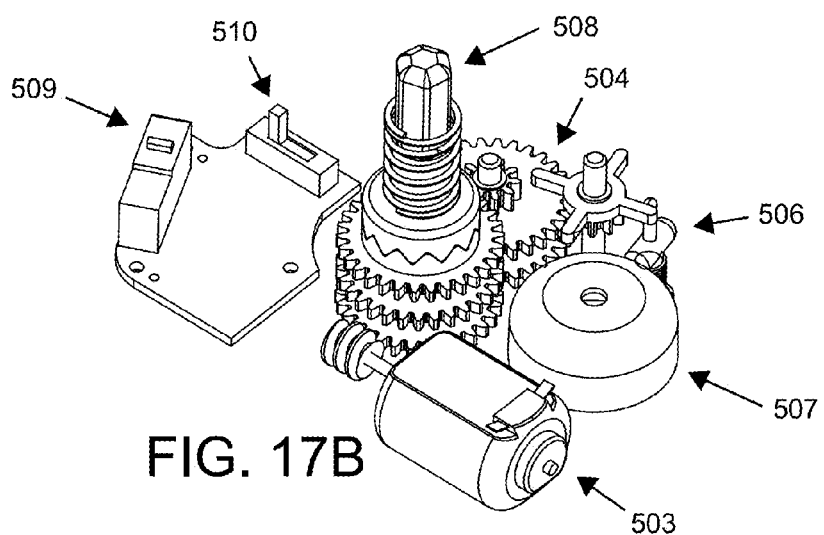
Figure 17C:
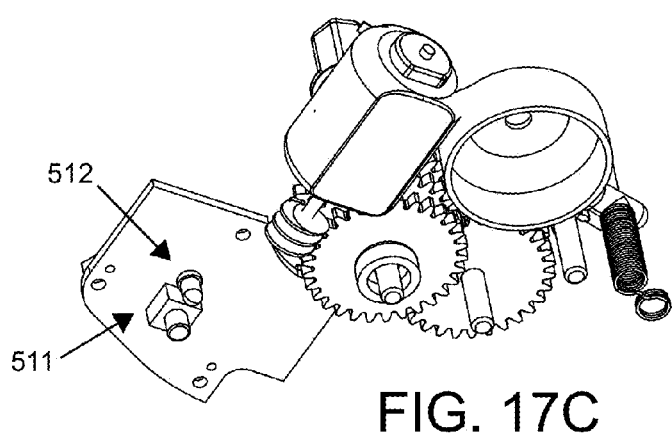
Figure 18A:
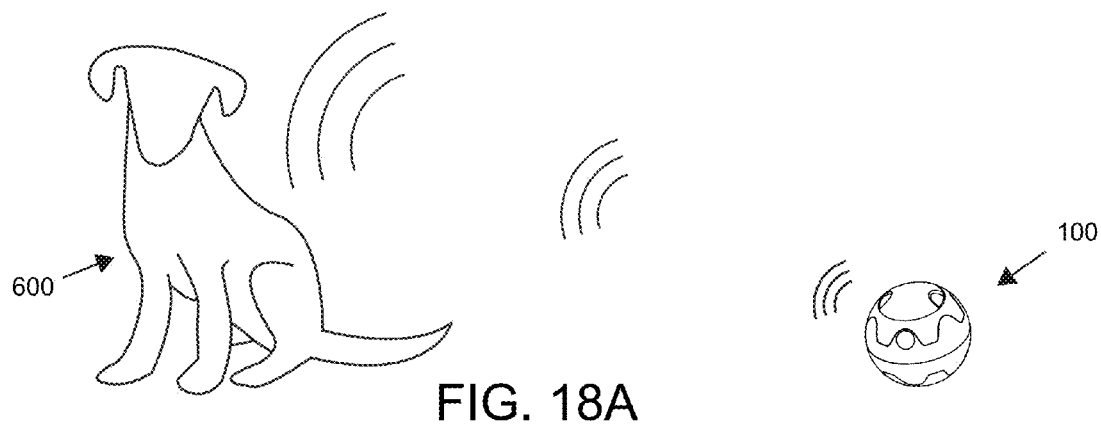
FIGS. 18A, 18B, and 18C show a step diagram of a dog interacting with the toy.
Figure 18B:
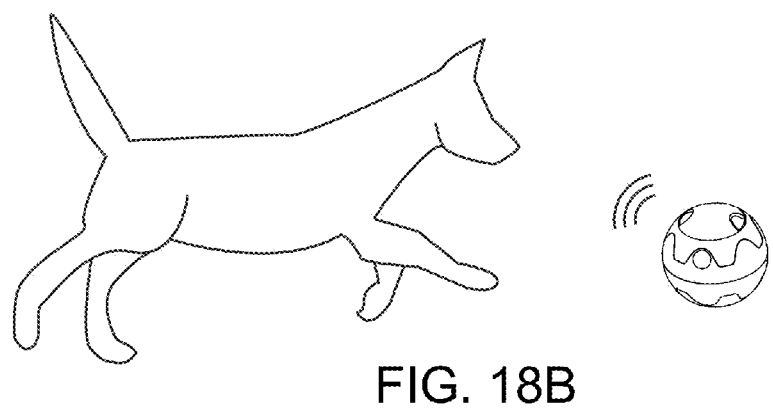
Figure 18C:
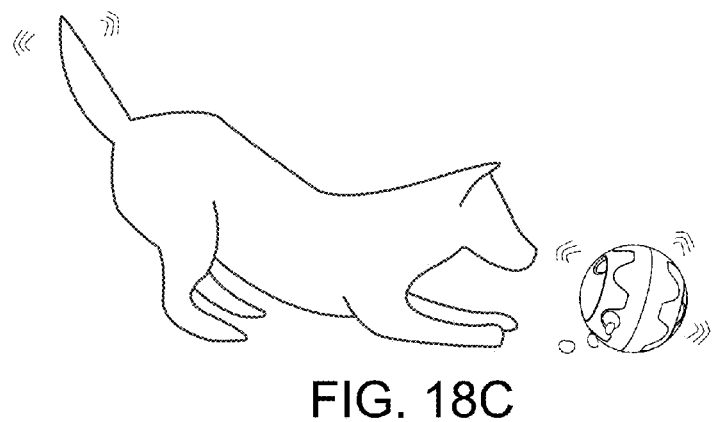
Figure 19:
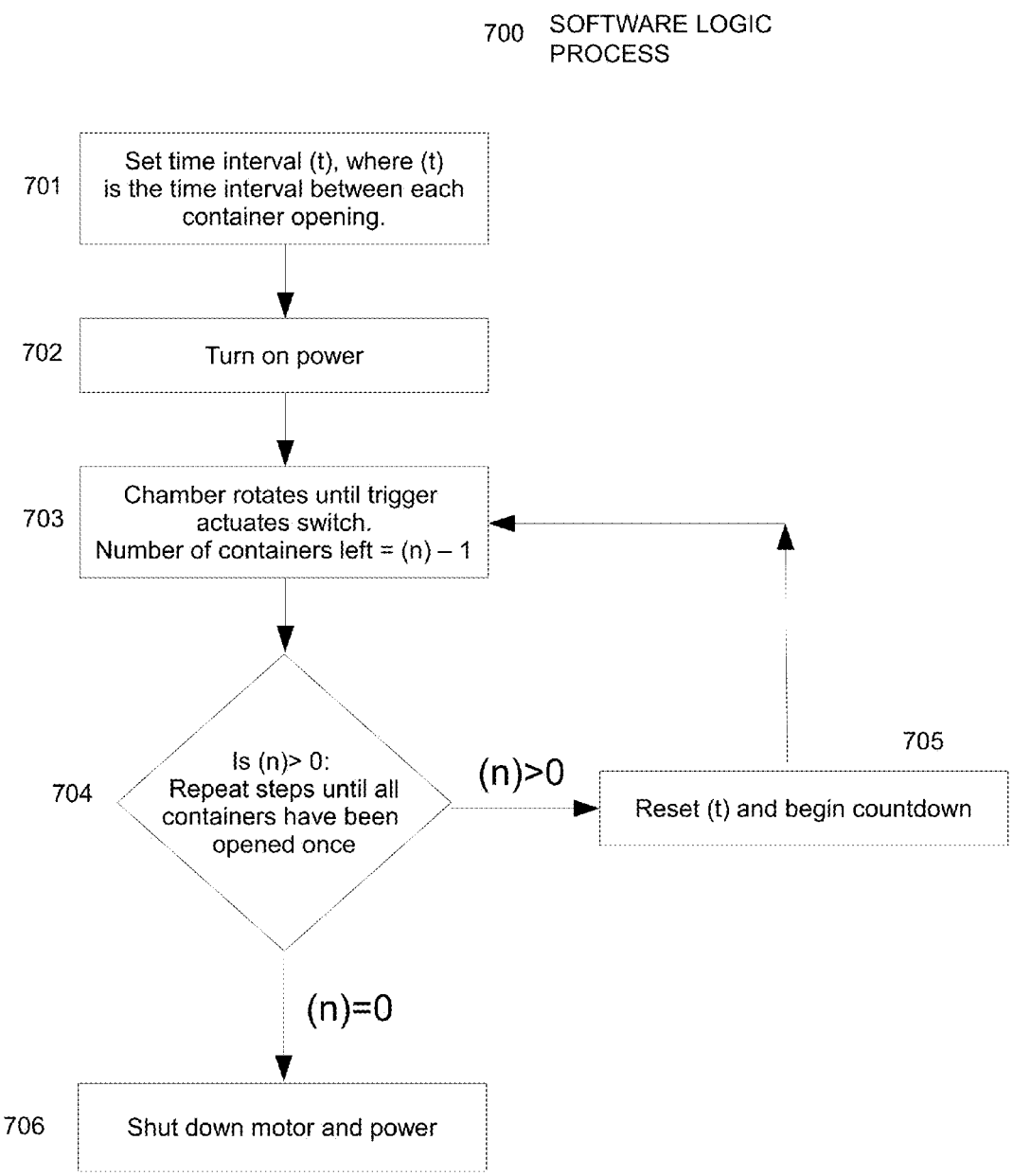
FIG. 19 shows a diagram flowchart of the software logic used in the toy.
Figure 20:
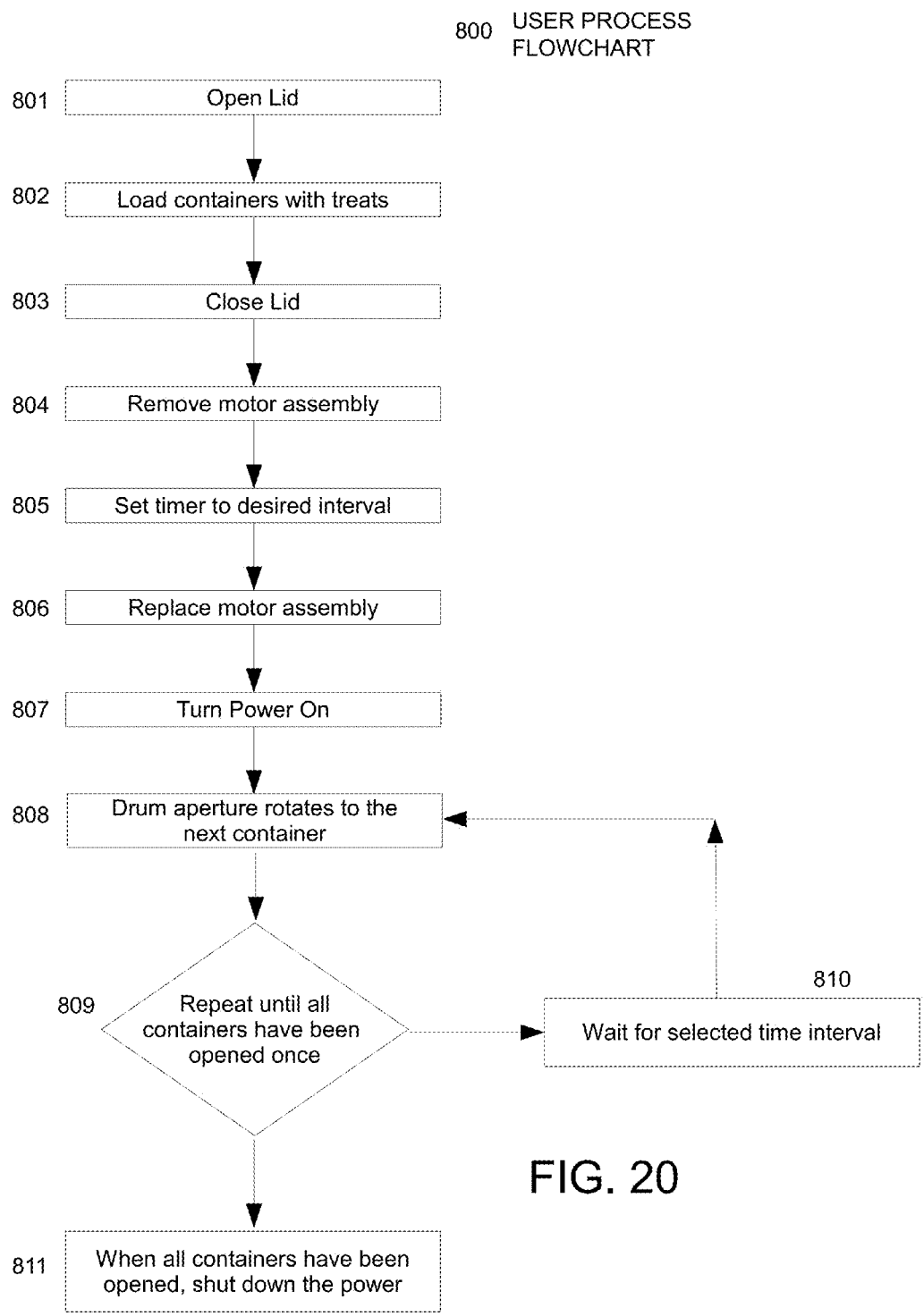
FIG. 20 shows a step-by-step use of the toy by the owner.

The lid 200 is located at the top of the housing, and in the preferred embodiment is secured using a twist-lock method. A plurality of recessed finger grips 201 are present to assist users in tightening or opening the lid. The inner surface of the lid has a plurality of dividers 203 that aligns with the top portion of the plurality of the divider walls in the inner chamber, creating a complete enclosure of the individual containers 305 from the base 301 to the inner surface of the lid 200. The plurality of containers 305 are completely enclosed from one another such that the treats are separately contained within each container space; the only possible means of access to the individual container would be by opening the lid 200 or when the drum aperture opening 403 aligns completely with the inner chamber perimeter wall opening 303 of a given container. FIGS. 15a, 15b, and 15c along with FIGS. 16a, 16b, and 16c show the step by step operation of a container being opened and closed during the rotation of the drum aperture 400.

The drum aperture 400 has a preferably circular base 401, and a perimeter wall 402 perpendicular to the base forming a substantially a cylindrical shape. Located at the center of the external surface base is a socket 404 for the driveshaft 507 that connects the motor assembly 500 to the drum aperture 400. The base 401 is slightly recessed inside the perimeter wall 402 to accommodate the depth of the motor assembly 500 being inserted into the lower housing 102 and the drum aperture 400. In the preferred embodiment, the socket 404 is shaped in a way that conforms with the driveshaft 507 such that the driveshaft firmly holds to the socket and does not slip when rotating the drum aperture 400. A symmetrical shape such as a hexagon or an octagon is preferred because it allows multiple ways of the drive fitting into the socket when the motor assembly is replaced into the toy. An opening in the perimeter wall of the aperture 403 is provided to allow treats to travel from the separate containers 305 to the external chamber 104. The size and shape of the opening 403 should conform substantially of the inner chamber perimeter wall openings 303 of the individual containers to maximize the number of treats dispensed when a container 305 is opened by the drum aperture 400.

A plurality of scooping fins 405 can be provided in the upper and lower edges of the perimeter wall 402 that conforms to the shape of the internal surface of the housing 100 as an alternate embodiment of the present invention. The scooping fins 405 prevent any treats that may inadvertently jam on the corners and prevent the drum aperture 400 moving freely during operation. At the perimeter of the external surface of the drum aperture base 401, a plurality of evenly spaced trigger actuators 406 around the perimeter of the base are provided to interact with the stop switch 508 on the motor assembly 500 and regulate the operation of the motor 502.

The motor assembly 500 comprises a housing for the battery 501 powering the motor, a battery cover 502, a motor 503 connected to a plurality of gears 504, said plurality of gears having connected to a clutch 505 and a striker 506 that strikes a mechanical bell 507. The clutch is then connected to driveshaft 508 that can be inserted into a driveshaft socket 404 located on the base of the drum aperture 401. It should be clear to a person having ordinary skill in the art that the striker and mechanical bell portion can be substituted as any noisemaking device that is synchronized to the rotating motion of the drive shaft. Present within the motor assembly is a stop switch 509 that is activated by a plurality of actuators located at the perimeter of the external surface of the drum aperture base. Whenever the stop switch 509 is pressed by the actuator, it stops the motor from moving the drum aperture around the internal chamber. The stop switch 509 is located on the inner side of the motor assembly facing the external surface of the drum aperture base. An interval selector 510 is provided on the inner side of the motor assembly that can be toggled by the user to set the time interval for the aperture opening moving to the next chamber. Having the stop switch 509 and the interval selector 510 located on the inner side of the motor assembly minimizes the possibility of a pet accidentally accessing these control functions. A power button 511 is provided on the outer side of the motor assembly. The power button 511 is recessed slightly so a pet cannot reach the button, but a human using his/her finger can. In the preferred embodiment, an LED indicator 512 is provided along with the power button to inform the user about the mode and the status of the motor. The power button 511 and LED indicator 512 sit on a Printed Circuit Board (PCB) assembly 515 that stores the software logic for the motor operation.

A speaker grill 514 is provided to allow sound to travel out from the noisemaker 507. A plurality of recessed finger grips 513 are provided on the outer side of the motor assembly to assist a person to comfortably grip the motor assembly during removal and replacement of the assembly. In the preferred embodiment, the motor assembly is located at the base of the toy and drum aperture and acts as a lower center of gravity for the toy. The contents of the motor assembly acts as a weight, and eliminates the need for a separate weight to achieve a lower center of gravity in an alternate version of the toy.

The noisemaker 507 creates a sound to attract the pet to interact with the puzzle toy. In the preferred embodiment, the sound produced by the noisemaker is timed to coincide with the rotation of the drum aperture 400 to signal the pet that there are treats ready to be dispensed from the toy. The noisemaker can be in the form of a traditional mechanical bell, as chosen in the preferred embodiment. However, it should be noted that the noisemaker can be in the form of a digital sound chip playing a prerecorded sound, music, or speech that simulates the action of a mechanical bell.

In the preferred embodiment, the housing, the lid, and the rotating aperture is made out of food grade plastics, such as HDPE, PE, LDPE, ABS, PET, and other suitable food grade plastic commonly used in the field for food containers. The food grade plastic is chosen for its inert, durable characteristics such that it is safe for the pet to consume treats dispensed from the puzzle toy. Finally, the pet owner can safely disassemble and wash the puzzle pet toy after use, and the parts made out of the food grade plastic is ideally made to be dishwasher safe.

Figure 21:
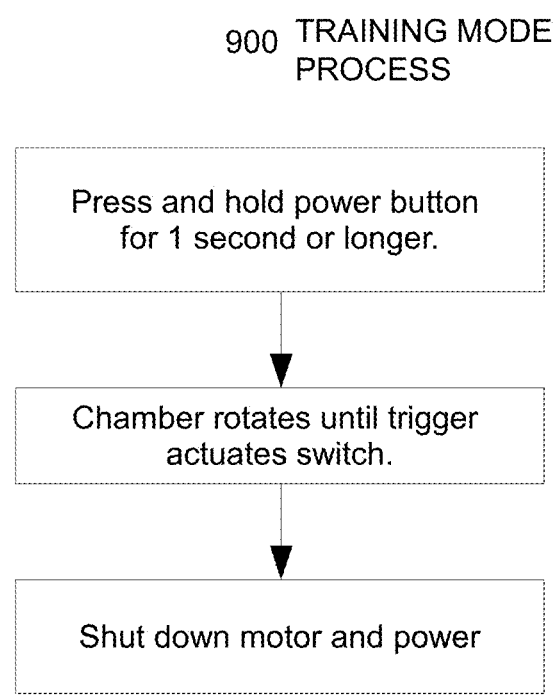
FIG. 21 shows a diagram flowchart of a training mode feature in the preferred embodiment.

FIGS. 21a, 21b and 21c show the method of play of the preferred embodiment. A pet owner leaves the pet 600 with the toy fully loaded with the treats, sets the time interval, and leaves the pet alone with the toy. As the motor rotates the drum aperture, a noisemaker in the assembly emits an audible sound to attract the pet's attention. As the pet approaches the toy and interacts with the toy, the toy wobbles around and dispenses treats from the external chamber. The pet then eats the treats dispensed from the toy, and usually will attempt to retrieve more treats by playing with the toy. In the usual scenario, the pet will usually lose interest as soon as it perceives all the treats that have been dispensed by the toy, and would leave the toy alone. The toy then counts down to the next scheduled time interval. Once the countdown is reached, the toy activates the motor, with the drum aperture moving to the next chamber and while doing so, activates the noisemaker that lasts for a few seconds as the drum aperture moves to the next container. The pet will gradually associate the noise with the toy dispensing treats, and will have enough motivation to play with the toy even when the owner is not around.

In the preferred embodiment, the toy can have several modes of use. One such mode is the general use, where the user opens the lid 801, loads the treat into the containers 802, close the lid 803, remove the motor assembly from the toy 804, set a time interval 805, replace the motor assembly 806, activate the toy by turning the power on 807, and as the toy is powered on the drum aperture rotates to the next container 809, and finally leaving the toy for the pet to play with. FIG. 22 shows a flowchart of the software logic used in the preferred embodiment to regulate the interval between opening the next container. The time interval can be set in increments of 15 minutes between the rotation to the next chamber (15 minutes, 30 minutes, 45 minutes, and 1 hour), or other time intervals desirable for the toy. Another mode available to the user is the training or demo function, where the drum aperture rotates only once to dispense the treats on the next available chamber. FIG. 24 shows a flowchart of this mode. The purpose of this function is to train a pet to associate the sound and movements made by the toy with the dispensing of the treat, so the pet understands what the sound means when left alone with the toy. The second mode is desirable in scenarios where the pet has an aversion to the toy, or does not comprehend the function of the toy such that the owner needs to train the pet to understand the purpose of the toy.

In the training mode, a user simply presses and hold the power button for at least one second or longer 900. When this is done, the chamber rotates until the trigger actuates switch, and this action shuts down the motor and power. The user can repeat this action indefinitely with the pet, so the pet can associate the noise generated by the toy to signal play and feeding time. It should be noted that the mechanical action of activating the training mode is for illustration purposes, and a person having skilled in the art can create an analogous function with a variation of the process, and this variations are meant to be covered under this disclosure.

In the Summary of the Invention above and in the Detailed Description of the Invention, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

Although the present invention has been described in considerable detail with reference to certain preferred versions thereof, other versions are possible. Therefore, the spirit and scope of the appended claims should not be limited to the description of the preferred version contained herein.

What is claimed:
1. A puzzle pet toy and treat dispenser, comprising:
  a. A motor assembly at the base of said pet toy and treat dispenser, said motor assembly comprising a power source, said power source connected to at least one motor, said motor connected to a printed circuit board (PCB), said PCB further including a power switch, LED indicator, and timer settings, said motor further connected to a drivetrain, said drivetrain connected to a clutch, said clutch connected to a driveshaft;
  b. An inner chamber, said inner chamber comprising a base, said base connected to a plurality of vertical radial walls dividing said inner chamber into separate containers, said separate containers each including a tangential wall, and said each tangential wall including an opening;

c. A drum aperture, said drum aperture comprising a base and vertical wall with a substantially cylindrical shape, said base further including a drive shaft receiver and a plurality of actuators on the external surface of said base, said vertical wall further including an opening vertically aligned to the height of the radial wall of said separate containers;

d. A lid, said lid comprising a plurality of dividers on the internal surface of the lid that is aligned with said vertical radial walls in said inner chamber;

e. A housing, said housing comprising a receptacle at the base of the housing to receive said motor assembly, said housing including at least one opening to allow treats to be dispensed from the toy; and f. An external chamber formed by the internal surface of said housing and the external surface of the drum aperture.

2. A puzzle pet toy and treat dispenser of claim 1, where said motor assembly further including a noisemaker to attract pets to play with the toy.

3. A puzzle pet toy and treat dispenser of claim 2, where said noisemaker is a mechanical bell assembly.

4. A puzzle pet toy and treat dispenser of claim 2, where said noisemaker is a digital prerecorded sound player.

5. A puzzle pet toy and treat dispenser of claim 1, where said housing, said drum aperture, and said lid is made out of food grade plastic materials.

6. A puzzle pet toy and treat dispenser of claim 1, where said vertical wall further includes a plurality of fins aligned along the inner wall of the curvature of said inner surfaces of said housing.

7. A method for using a puzzle pet toy and treat dispenser with a domestic pet, comprising: a motor assembly at the base of said pet toy and treat dispenser, said motor assembly comprising a power source, said power source connected to at least one motor, said motor connected to a printed circuit board (PCB), said PCB further including a power switch, LED indicator, and timer settings, said motor further connected to a drivetrain, said drivetrain connected to a clutch, said clutch connected to a driveshaft; an inner chamber, said inner chamber comprising a base, said base connected to a plurality of vertical radial walls dividing said inner chamber into separate containers, said separate containers each including a tangential wall, and said each tangential wall including an opening; a drum aperture, said drum aperture comprising a base and vertical wall with a substantially cylindrical shape, said base further including a drive shaft receiver and a plurality of actuators on the external surface of said base, said vertical wall further including an opening vertically aligned to the height of the radial wall of said separate containers; a lid, said lid comprising a plurality of dividers on the internal surface of the lid that is aligned with said vertical radial walls in said inner chamber; a housing, said housing comprising a receptacle at the base of the housing to receive said motor assembly, said housing including at least one opening to allow treats to be dispensed from the toy; and an external chamber formed by the internal surface of said housing and the external surface of the drum aperture; and having the steps of:

a. Loading the plurality of treat containers with non-fluid pet treats;

b. Setting a time interval in between the dispensing action of each treat container;

c. Letting a pet interact with the puzzle pet toy and treat dispenser until the puzzle pet toy and treat dispenser completely dispenses the treats in the plurality of the treat containers.

* * * * *